United States Patent
Ogawa et al.

(10) Patent No.: US 11,595,935 B2
(45) Date of Patent: Feb. 28, 2023

(54) RADIO INFORMATION COLLECTION METHOD AND RADIO INFORMATION COLLECTION SYSTEM

(71) Applicant: Nippon Telegraph and Telephone Corporation, Tokyo (JP)

(72) Inventors: Tomoaki Ogawa, Musashino (JP); Hiroyuki Nakamura, Musashino (JP); Shinya Otsuki, Musashino (JP); Makoto Umeuchi, Musashino (JP); Junichi Iwatani, Musashino (JP); Hiroshi Sakamoto, Musashino (JP); Masayoshi Nabeshima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 132 days.

(21) Appl. No.: 17/282,465

(22) PCT Filed: Sep. 27, 2019

(86) PCT No.: PCT/JP2019/038310
§ 371 (c)(1),
(2) Date: Apr. 2, 2021

(87) PCT Pub. No.: WO2020/075542
PCT Pub. Date: Apr. 16, 2020

(65) Prior Publication Data
US 2021/0385782 A1    Dec. 9, 2021

(30) Foreign Application Priority Data
Oct. 11, 2018  (JP) .............................. JP2018-192698

(51) Int. Cl.
*H04W 24/00*   (2009.01)
*H04W 64/00*   (2009.01)
(Continued)

(52) U.S. Cl.
CPC .......... *H04W 64/003* (2013.01); *H04B 17/27* (2015.01); *H04W 16/18* (2013.01)

(58) Field of Classification Search
CPC ..... H04W 64/003; H04W 16/18; H04B 17/27
See application file for complete search history.

(56) References Cited

U.S. PATENT DOCUMENTS

2013/0029592 A1 *  1/2013  Yuda ..................... H04W 24/02
                                                          455/524
2014/0357297 A1 * 12/2014  Futaki .................. H04W 24/10
                                                          455/456.1

FOREIGN PATENT DOCUMENTS

JP          6106110       3/2017
WO    WO 2011/129231     10/2011
WO    WO 2013/108819      7/2013

* cited by examiner

*Primary Examiner* — Justin Y Lee
(74) *Attorney, Agent, or Firm* — Fish & Richardson P.C.

(57) ABSTRACT

In a wireless information collecting method executed by at least one user terminal device that measures wireless information used in a site survey and a server device that stores the wireless information and performs the site survey, the user terminal device performs a step of periodically measuring a current position and transmitting positioning information indicating the current position to the server device, and a step of measuring the wireless information in accordance with a wireless information measurement number instructed by the server device and transmitting wireless information including a position and time to the server device. The server device performs a step of associating a position of the user terminal device and time with the wireless information and creating and updating a condition map indicating a wireless information measurement number at a position and time at which a site survey is performed, and a step of collating the current position of the user terminal and the time with the condition map and transmit- (Continued)

ting an instruction for the wireless information measurement number based on the current position of the user terminal device and the time to the user terminal device.

6 Claims, 3 Drawing Sheets

(51) Int. Cl.
*H04B 17/27* (2015.01)
*H04W 16/18* (2009.01)

RADIO INFORMATION COLLECTION METHOD AND RADIO INFORMATION COLLECTION SYSTEM

CROSS-REFERENCE TO RELATED APPLICATIONS

This application is a National Stage application under 35 U.S.C. § 371 of International Application No. PCT/JP2019/038310, having an International Filing Date of Sep. 27, 2019, which claims priority to Japanese Application Serial No. 2018-192698, filed on Oct. 11, 2018. The disclosure of the prior application is considered part of the disclosure of this application, and is incorporated in its entirety into this application.

TECHNICAL FIELD

The present disclosure relates to a wireless information collecting method and a wireless information collecting system for performing a site survey.

BACKGROUND ART

When the quality of wireless communication currently being used is checked or the placement of a base station is newly examined to use wireless communication from now on, it is necessary to ascertain information of the current communication traffic state of a wireless information system desired to be used, information of the intensity of radio waves for each frequency band, and information indicating the state of interference waves (hereinafter, this information will be collectively referred to as "wireless information") for a target area. In order to accurately ascertain the wireless information, it is necessary to perform a site survey for collecting actually detected wireless information as information mapped to positional information (geographic information) while moving within an area by using a wireless terminal for measurement at an actual location.

In a general site survey, a measurer carries a wireless terminal or the like having a function of displaying a map and moves while checking his or her own position in a measurement area by hand and considering a measurement position that he or she will measure next to measure wireless information.

Further, in order to measure wireless information with accuracy meeting the purpose of use in a use area in a site survey, it is necessary for a measurer himself or herself to determine a location where wireless information is required to be measured by using a wireless terminal capable of measuring wireless information and to measure wireless information while moving at a movement speed considering a measurement timing of wireless information.

In addition, a wireless terminal generally collects all wireless information during an operation. A large amount of wireless information collected in this manner may include wireless information hindering an improvement in the accuracy of ascertainment of a radio wave state due to large error factors included in the wireless information. For example, there is a concern that radio wave intensities measured while moving may include an error factor as a radio wave intensity with respect to a position by associating measurement positions different from measurement positions of the radio wave intensities with each other according to the position movement of a measurer. For this reason, it is necessary to select appropriate wireless information from a large amount of measured wireless information. In addition, a propagation path of radio waves varies from moment to moment due to environmental fluctuations such as the movement of a shield, and thus it is necessary to repeat a site survey in order to obtain accurate wireless information.

In order to cope with the above-described problems, a technique of Patent Literature 1 is disclosed. In the technique, a user terminal notifies a server of wireless information and positional information measured and collected in response to an instruction from the server, and determines an unmeasured area and an insufficient area for wireless information in the server and the number of pieces of wireless information required to have a predetermined degree of certainty. A position where the user terminal performs a site survey and the number of pieces of wireless information to be collected at the position are derived, and the user terminal is given instructions for the position and the number, thereby making it possible to efficiently and accurately perform a site survey.

CITATION LIST

Patent Literature

Patent Literature 1: JP 6106110 B

SUMMARY OF THE INVENTION

Technical Problem

Conditions for performing a site survey (a condition map) such as an unmeasured area and an insufficient area for wireless information and the number of pieces of wireless information required to have a predetermined degree of certainty, which are determined by a server on the basis of wireless information and positional information measured by a user terminal, also vary depending on a time slot. For example, when viewed throughout a day, there may be a situation where emphasis is placed on a specific time slot such as morning or evening and there is a blank time slot even when the number of pieces of wireless information measured in a certain area is sufficient. However, the technique disclosed in Patent Literature 1 does not provide a condition map for performing a site survey in consideration of a time slot.

An object of the present disclosure is to provide a wireless information collecting method and a wireless information collecting system which allow a user terminal device to easily perform a site survey considering a location and time.

Means for Solving the Problem

A first invention is a wireless information collecting method executed by at least one user terminal device that measures wireless information used in a site survey and a server device that stores the wireless information and performs the site survey, the wireless information collecting method comprising: causing the user terminal device to perform a step of periodically measuring a current position and transmitting positioning information indicating the current position to the server device, and a step of measuring the wireless information in accordance with a wireless information measurement number instructed by the server device and transmitting wireless information including a position and time to the server device; and causing the server device to perform a step of associating a position of the user terminal device and time with the wireless information and creating and updating a condition map indicating a wireless information measurement number at a position and time at which a site survey is performed, and a step of collating the current position of the user terminal device and the time with the condition map and transmitting an instruction for the wireless information measurement number based on the current position of the user terminal device and the time to the user terminal device.

A second invention is a wireless information collecting method executed by at least one user terminal device that measures wireless information used in a site survey and a server device that stores the wireless information and performs the site survey, the wireless information collecting method comprising: causing the server device to perform a step of creating a condition map including a position and time at which the wireless information is measured and a wireless information measurement number and periodically transmitting the condition map to the user terminal device; and causing the user terminal device to perform a step of measuring the wireless information and transmitting the wireless information to the server device in a case where a measured current position and time of the user terminal device are consistent with the condition map received from the server device.

In the wireless information collecting method according to the first or second invention, the server device may create the condition map indicating a wireless information type and a wireless information measurement number which are capable of being measured in accordance with a function of the user terminal device, in addition to the position of the user terminal device and the time, and the user terminal device may measure the wireless information based on the current position, the time, and the function.

A third invention is a wireless information collecting system including at least one user terminal device configured to measure wireless information used in a site survey; and a server device configured to store the wireless information and perform the site survey, wherein the user terminal device includes a unit that periodically measures a current position and transmits positioning information indicating the current position to the server device, a unit that measures the wireless information in accordance with a wireless information measurement number instructed by the server device and transmits wireless information including a position and time to the server device, and the server device includes a unit that associates a position of the user terminal device and time with the wireless information and creates and updates a condition map indicating a wireless information measurement number at a position and a time at which a site survey is performed, and a unit that collates the current position of the user terminal device and the time with the condition map and transmits an instruction for the wireless information measurement number based on the current position of the user terminal device and the time to the user terminal device.

A fourth invention is a wireless information collecting system including at least one user terminal device configured to measure wireless information used in a site survey; and a server device configured to store the wireless information and perform the site survey, wherein the server device includes a unit that creates a condition map including a position and time at which the wireless information is measured and a wireless information measurement number and periodically transmits the condition map to the user terminal device, and the user terminal device includes a unit that measures the wireless information and transmits the wireless information to the server device in a case where a measured current position and time of the user terminal device are consistent with the condition map received from the server device.

In the wireless information collecting system according to the third or fourth invention, the server device may include a unit that creates the condition map indicating a wireless information type and a wireless information measurement number which are capable of being measured in accordance with a function of the user terminal device, in addition to the position of the user terminal device and the time, and the user terminal device may include a unit that measures the wireless information based on the current position, the time, and the function.

Effects of the Invention

In the present disclosure, a user terminal device can easily perform a site survey considering a location and time in response to an instruction received from a server device or by receiving a condition map provided by the server device.

DESCRIPTION OF EMBODIMENTS

First Embodiment

Figure 1:
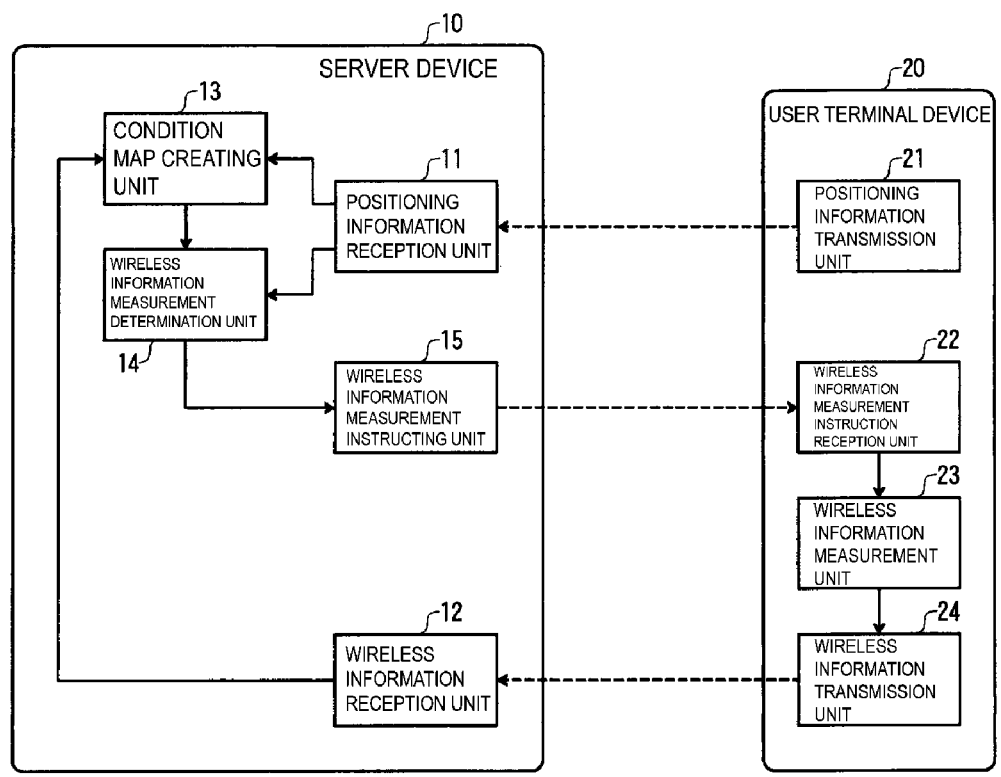
FIG. 1 is a diagram illustrating a configuration example of a wireless information collecting system according to a first embodiment of the present disclosure.

FIG. 1 illustrates a configuration example of a wireless information collecting system according to a first embodiment of the present disclosure.

In FIG. 1, the wireless information collecting system is constituted by a server device 10 and a user terminal device 20 connected to the server device 10 through a network (not illustrated). Here, one of a plurality of user terminal devices 20 connected to a network is illustrated.

The server device 10 is constituted by a positioning information reception unit 11, a wireless information reception unit 12, a condition map creating unit 13, a wireless information measurement determination unit 14, and a wireless information measurement instructing unit 15. The positioning information reception unit 11 receives positioning information indicating the current position of the user terminal device 20. The wireless information reception unit 12 receives wireless information including a position and time measured by the user terminal device 20. The condition map creating unit 13 creates a condition map indicating a wireless information measurement number required for each position and time at which a site survey is performed on the basis of the received positioning information and wireless information. The wireless information measurement determination unit 14 collates the condition map with the positional information and time received from the user terminal device 20 to determine whether or not wireless information is measured in accordance with the current position of the user terminal device 20 and time. The wireless information measurement instructing unit 15 transmits an instruction for wireless information measurement (a wireless information measurement number at the position of the user terminal device and time) based on the determination result to the user terminal device 20. Meanwhile, here, only main functional blocks related to the present disclosure are shown, and functional blocks that are generally used in the server device 10 and the description thereof will be omitted.

The user terminal device 20 is constituted by a positioning information transmission unit 21, a wireless information measurement instruction reception unit 22, a wireless information measurement unit 23, and a wireless information transmission unit 24. The positioning information transmission unit 21 measures a current position and transmits positioning information thereof to the server device 10. The wireless information measurement instruction reception unit 22 receives an instruction for wireless information measurement transmitted from the server device 10. The wireless information measurement unit 23 performs scanning by a wireless information measurement number at the position and time to measure wireless information. The wireless information transmission unit 24 transmits wireless information including a measured position and time to the server device 10. Meanwhile, here, only main functional blocks related to the present disclosure are shown, and functional blocks that are generally used in the user terminal device 20 and the description thereof will be omitted.

Hereinafter, an operation procedure of the wireless information collecting system of the first embodiment will be described.

(1) The positioning information transmission unit 21 of the user terminal device 20 periodically measures a current position and transmits positioning information indicating the current position to the server device 10.

(2) The positioning information reception unit 11 of the server device 10 notifies the condition map creating unit 13 and the wireless information measurement determination unit 14 of the current position of the user terminal device 20 and time from the received positioning information.

(3) The wireless information measurement determination unit 14 of the server device 10 collates the current position of the user terminal device 20 and time with the condition map of the condition map creating unit 13, and determines whether or not wireless information is measured in accordance with the current position of the user terminal device 20 and a time. Then, the wireless information measurement instructing unit 15 transmits an instruction for measuring wireless information (a wireless information measurement number at the position of the user terminal device and time) to the user terminal device 20 at the position and time at which the user terminal device 20 measures wireless information.

(4) The wireless information measurement instruction reception unit 22 of the user terminal device 20 notifies the wireless information measurement unit 23 of the received instruction for measuring wireless information. Then, the wireless information measurement unit 23 repeatedly performs scanning in accordance with the instructed wireless information measurement number to measure wireless information. The wireless information transmission unit 24 transmits wireless information including a position and time measured by the wireless information measurement unit 23 to the server device 10.

(5) The wireless information reception unit 12 of the server device 10 outputs the received wireless information to the condition map creating unit 13.

(6) The condition map creating unit 13 of the server device 10 associates the position of the user terminal device 20 and time with wireless information, and creates and updates a condition map indicating a wireless information measurement number at a position and time at which a site survey is performed.

In this manner, in the first embodiment, the server device 10 determines whether or not wireless information is measured by a site survey at the position of the user terminal device 20 and time. The user terminal device 20 measures a necessary wireless information number at the current position and time in response to an instruction based on the determination of the server device 10, and thus it is possible to measure necessary and sufficient wireless information while reducing the burden on the user terminal device 20.

Figure 3:
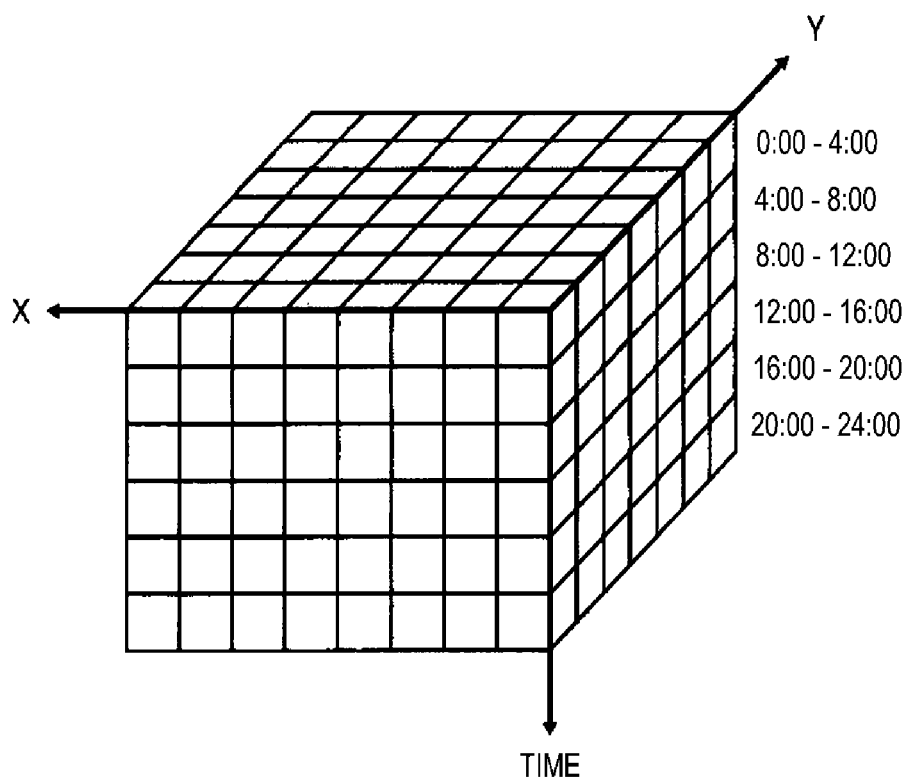
FIG. 3 is a diagram illustrating an example of a condition map.

Here, an example of a condition map is illustrated in FIG. 3.

The condition map creating unit 13 of the server device 10 divides a peripheral area of a user into two-dimensional mesh cells of an x-axis and a y-axis, also divides the peripheral area in a time direction, and stores wireless information measured in a three-dimensional mesh unit of a two-dimensional position and time.

In addition, the condition map creating unit 13 of the server device 10 may weight the measured wireless information number in accordance with a movement speed of the user terminal device 20. For example, in a case where the movement speed is high, the reliability of a correspondence relationship between a position and wireless information is reduced, and thus a predetermined number (predetermined ratio) may be subtracted from the measured wireless information number. Further, the degree of newness of measured wireless information may also be weighted. For example, for old wireless information, a predetermined number (predetermined ratio) may be subtracted from the measured wireless information number. In addition, the measured wireless information number may be leveled in a mesh unit.

The condition map creating unit 13 of the server device 10 derives a wireless information measurement number required to satisfy the accuracy required for each mesh cell in consideration of the above description, and creates a condition map in a three-dimensional mesh unit of a two-dimensional position and time. The same applies to a second embodiment to be described below.

Second Embodiment

Figure 2:
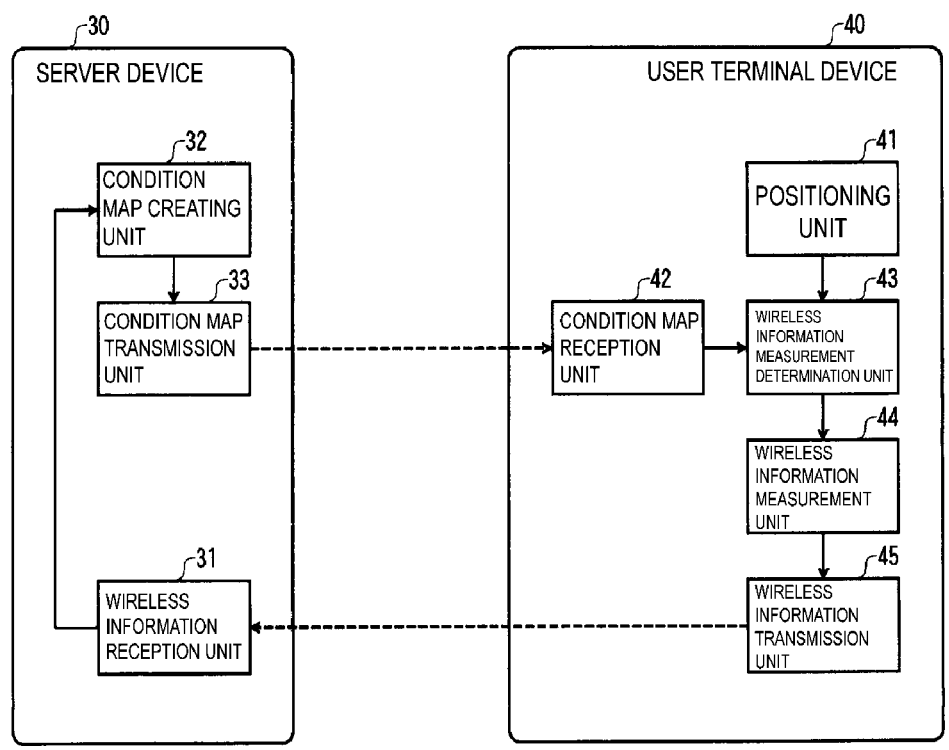
FIG. 2 is a diagram illustrating a configuration example of a wireless information collecting system according to a second embodiment of the present disclosure.

FIG. 2 illustrates a configuration example of a wireless information collecting system according to a second embodiment of the present disclosure.

In FIG. 2, the wireless information collecting system is constituted by a server device 30 and a user terminal device 40 which is connected to the server device 30 through a network (not illustrated). Here, one of a plurality of user terminal devices 40 connected to a network is illustrated.

The server device 30 is constituted by a wireless information reception unit 31, a condition map creating unit 32, and a condition map transmission unit 33. The wireless information reception unit 31 receives wireless information including a position and time measured by the user terminal device 40. The condition map creating unit 32 creates a condition map indicating a wireless information measurement number required for each position and time in which a site survey is performed on the basis of the received wireless information. The condition map transmission unit 33 transmits the condition map to the user terminal device 40. Meanwhile, here, only main functional blocks related to the present disclosure are shown, and functional blocks that are generally used in the server device 30 and the description thereof will be omitted.

The user terminal device 40 is constituted by a positioning unit 41, a condition map reception unit 42, a wireless information measurement determination unit 43, a wireless information measurement unit 44, and a wireless information transmission unit 45. The positioning unit 41 measures a current position. The condition map reception unit 42 receives the condition map transmitted from the server device 30. The wireless information measurement determination unit 43 collates the received condition map with a current position and time measured by the positioning unit 41, and determines whether or not wireless information is measured in accordance with the current position of the user terminal device 40 and time. The wireless information measurement unit 44 performs scanning by a wireless information measurement number at the position and time to measure wireless information. The wireless information transmission unit 45 transmits wireless information including a measured position and time to the server device 30. Meanwhile, here, only main functional blocks related to the present disclosure are shown, and functional blocks that are generally used in the user terminal device 40 and the description thereof will be omitted.

Hereinafter, an operation procedure of the wireless information collecting system of the second embodiment will be described.

(1) The positioning unit 41 of the user terminal device 40 periodically measures a current position and transmits the measured current position to the wireless information measurement determination unit 43.

(2) The condition map reception unit 42 of the user terminal device 40 receives the condition map from the server device 30 and outputs the received condition map to the wireless information measurement determination unit 43.

(3) The wireless information measurement determination unit 43 of the user terminal device 40 collates the current position and time with the condition map, and determines whether or not wireless information is measured in accordance with the current position and time. Then, the wireless information measurement determination unit 43 notifies the wireless information measurement unit 44 of a wireless information measurement number to be measured at the position and time in which the user terminal device 40 measures wireless information.

(4) The wireless information measurement unit 44 of the user terminal device 40 repeatedly performs scanning in accordance with the wireless information measurement number to measure wireless information. Then, the wireless information transmission unit 45 transmits wireless information including a position and time measured by the wireless information measurement unit 44 to the server device 30.

(5) The wireless information reception unit 31 of the server device 30 receives the wireless information at the position of the user terminal device 40 and time and outputs the wireless information to the condition map creating unit 32.

(6) The condition map creating unit 32 of the server device 30 associates the position of the user terminal device 40 and time with the wireless information, and creates and updates a condition map indicating a wireless information measurement number at a position and time at which a site survey is performed.

In this manner, in the second embodiment, the server device 30 creates a condition map indicating a wireless information measurement number measured by a site survey at the position of the user terminal device 40 and time, and the user terminal device 40 is periodically notified of the created condition map. The user terminal device 40 determines whether or not wireless information is measured by a site survey at a current position and time in accordance with the condition map and measures a necessary wireless information measurement number at the current position and time, and thus it is possible to measure necessary and sufficient wireless information while reducing the burden on the user terminal device 40.

Third Embodiment

A third embodiment is configured such that a user terminal device performing a site survey inserts wireless information selected in accordance with the function thereof into a condition map in the first embodiment and the second embodiment. That is, in the condition map, a wireless information measurement number in a type unit of wireless information corresponding to user terminal devices having different functions is written as a four-dimensional mesh, in addition to a wireless information measurement number of a three-dimensional mesh of a two-dimensional position and time.

In the configuration of the wireless information collecting system illustrated in FIG. 1, the condition map creating unit 13 and the wireless information measurement determination unit 14 of the server device 10 determine a wireless information type and a wireless information measurement number that can be measured in accordance with the function of the user terminal device 20, in addition to the position of the user terminal device 20 and time. The wireless information measurement instructing unit 15 instructs the user terminal device 20 to measure wireless information by a site survey.

In the configuration of the wireless information collecting system illustrated in FIG. 2, the condition map creating unit 32 of the server device 30 creates a condition map indicating a wireless information type and a wireless information measurement number that can be measured in accordance with the function of the user terminal device 40, in addition to the position of the user terminal device 40 and time, and the condition map transmission unit 33 notifies the user terminal device 40 of the condition map. The user terminal device 40 determines a current position, time, and a wireless information measurement number that can be measured in accordance with its own function on the basis of the condition map, and measures wireless information by a site survey.

REFERENCE SIGNS LIST 10, 30 Server device
11 Positioning information reception unit
12, 31 Wireless information reception unit
13, 32 Condition map creating unit
14 Wireless information measurement determination unit
15 Wireless information measurement instructing unit
33 Condition map transmission unit
20, 40 User terminal device
21 Positioning information transmission unit
22 Wireless information measurement instruction reception unit
23, 44 Wireless information measurement unit
24, 45 Wireless information transmission unit
41 Positioning unit
42 Condition map reception unit
43 Wireless information measurement determination unit

The invention claimed is:

1. A wireless information collecting method executed by at least one user terminal device that measures wireless information used in a site survey and a server device that stores the wireless information and performs the site survey, the wireless information collecting method comprising:

causing the user terminal device to perform:

periodically measuring a current position and transmitting positioning information indicating the current position to the server device, receiving, from the server device, an instruction including a wireless information measurement number for the current position and a time of day at which the site survey is performed, wherein the wireless information measurement number varies depending on the time of day at which the site survey is performed, and measuring the wireless information in accordance with the wireless information measurement number instructed by the server device and transmitting the wireless information including the current position and the time of day to the server device; and causing the server device to perform:

in response to receiving the current position of the user terminal device, collating the current position of the user terminal device and the time of day with a condition map and determining whether or not the wireless information needs to be measured in accordance with the current position of the user terminal device and the time of day;

in response to determining that the wireless information needs to be measured, transmitting the instruction for the wireless information measurement number based on the current position of the user terminal device and the time of day to the user terminal device; and in response to receiving the wireless information from the user terminal device, associating the current position of the user terminal device and the time of day with the received wireless information and updating the condition map indicating the wireless information measurement number at the current position and the time of day at which the site survey is performed.

2. The wireless information collecting method according to claim 1, wherein the server device is configured to create the condition map indicating a wireless information type and the wireless information measurement number which are capable of being measured in accordance with a function of the user terminal device, in addition to the current position of the user terminal device and the time of day, and the user terminal device is configured to measure the wireless information based on the current position, the time of day, and the function.

3. A wireless information collecting method executed by at least one user terminal device that measures wireless information used in a site survey and a server device that stores the wireless information and performs the site survey, the wireless information collecting method comprising:

causing the server device to perform: creating a condition map including a position and a time of day at which the wireless information is measured and a wireless information measurement number for the position and the time of day and periodically transmitting the condition map to the user terminal device, wherein the wireless information measurement number varies depending on the time of day at which the wireless information is measured; and causing the user terminal device to perform: measuring the wireless information in accordance with the wireless information measurement number and transmitting the wireless information to the server device in a case where a measured current position and a current time of the user terminal device are consistent with the condition map received from the server device.

4. A wireless information collecting system comprising:

at least one user terminal device configured to measure wireless information used in a site survey; and a server device configured to store the wireless information and perform the site survey, wherein the user terminal device includes a positioning unit, including one or more processors, configured to periodically measure a current position and transmit positioning information indicating the current position to the server device, a wireless information measurement unit, including one or more processors, configured to measure the wireless information in accordance with a wireless information measurement number instructed by the server device, and a wireless information transmission unit, including one or more processors, configured to transmit the wireless information including the current position and a time of day to the server device, and the server device includes a condition map creating unit, including one or more processors, configured to associate the current position of the user terminal device and the time of day with the wireless information and create and update a condition map indicating the wireless information measurement number at the current position and the time of day at which the site survey is performed, wherein the wireless information measurement number varies depending on the time of day at which the site survey is performed, and a wireless information measurement determination unit, including one or more processors, configured to collate the current position of the user terminal device and the time of day with the condition map, and a wireless information measurement instruction unit, including one or more processors, configured to transmit an instruction for the wireless information measurement number based on the current position of the user terminal device and the time of day to the user terminal device.

5. The wireless information collecting system according to claim 4:

wherein the server device includes a unit, including one or more processors, configured to create the condition map including the current position and the time of day at which the wireless information is measured and the wireless information measurement number and periodically transmit the condition map to the user terminal device, and the user terminal device includes a unit, including one or more processors, configured to measure the wireless information and transmit the wireless information to the server device in a case where the measured current position and the time of day of the user terminal device are consistent with the condition map received from the server device.

6. The wireless information collecting system according to claim 4, wherein the server device includes a unit, including one or more processors, configured to create the condition map indicating a wireless information type and the wireless information measurement number which are capable of being measured in accordance with a function of the user terminal device, in addition to the current position of the user terminal device and the time of day, and
the user terminal device includes a unit, including one or more processors, configured to measure the wireless information based on the current position, the time of day, and the function.

\* \* \* \* \*